(12) United States Patent
Pursifull et al.

(10) Patent No.: US 10,221,784 B2
(45) Date of Patent: *Mar. 5, 2019

(54) METHOD AND SYSTEM FOR FUEL VAPOR MANAGEMENT

(71) Applicant: Ford Global Technologies, LLC, Dearborn, MI (US)

(72) Inventors: Ross Dykstra Pursifull, Dearborn, MI (US); Niels Christopher Kragh, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,856

(22) Filed: Oct. 24, 2017

(65) Prior Publication Data

US 2018/0045128 A1 Feb. 15, 2018

Related U.S. Application Data

(63) Continuation of application No. 14/252,665, filed on Apr. 14, 2014, now Pat. No. 9,797,322.

(51) Int. Cl.
*F02D 41/00* (2006.01)
*F02B 37/16* (2006.01)
(Continued)

(52) U.S. Cl.
CPC ............ *F02D 41/004* (2013.01); *F02B 37/16* (2013.01); *F02D 41/0042* (2013.01);
(Continued)

(58) Field of Classification Search
CPC .............. F02D 41/004; F02D 41/0042; F02D 41/0002; F02B 37/16; F02M 25/0836; F02M 25/089
(Continued)

(56) References Cited

U.S. PATENT DOCUMENTS 3,538,896 A * 11/1970 Cooper .................. F02M 25/08
123/519
4,932,386 A * 6/1990 Uozumi .............. F02D 41/0032
123/520

(Continued)

FOREIGN PATENT DOCUMENTS

CN 103216331 A 7/2013
CN 103321789 A 9/2013
(Continued)

OTHER PUBLICATIONS

Anonymous, "A Method to Infer CPV Leakage Learning and Perform Compensation," IPCOM No. 000235605, Published Mar. 11, 2014, 2 pages.
(Continued)

*Primary Examiner* — Mahmoud Gimie
(74) *Attorney, Agent, or Firm* — Julia Voutyras; McCoy Russell LLP

(57) ABSTRACT

Methods and systems are provided for improving the efficiency of canister purge completion. Based on engine operating conditions, a canister is purged to a compressor inlet or a throttle outlet. During purging conditions, as canister loads change, a purge flow through the canister is varied so that a fixed preselected portion of total engine fueling is delivered as fuel vapors.

20 Claims, 8 Drawing Sheets

(51) Int. Cl.
*F02M 25/08* (2006.01)
*F02M 35/10* (2006.01)
*F02D 9/02* (2006.01)

(52) U.S. Cl.
CPC ...... *F02M 25/089* (2013.01); *F02M 25/0836* (2013.01); *F02D 41/0002* (2013.01); *F02D 2009/024* (2013.01); *F02D 2250/41* (2013.01); *F02M 35/10157* (2013.01); *F02M 35/10222* (2013.01); *Y02T 10/144* (2013.01)

(58) Field of Classification Search
USPC .......................................................... 123/518
See application file for complete search history.

(56) References Cited

U.S. PATENT DOCUMENTS

| | | | |
|---|---|---|---|
| 5,005,550 A | | 4/1991 | Bugin, Jr. et al. |
| 5,048,492 A | * | 9/1991 | Davenport .......... F02D 41/0032 123/520 |
| 5,429,098 A | * | 7/1995 | Tomisawa ............. F02D 41/004 123/520 |
| 5,682,862 A | * | 11/1997 | Sato .................... F02D 41/0045 123/198 D |
| 9,279,397 B2 | | 3/2016 | Werner et al. |
| 9,328,702 B2 | | 5/2016 | Pursifull et al. |
| 9,347,368 B2 | | 5/2016 | Ulrey et al. |
| 9,382,825 B2 | | 7/2016 | Pursifull |
| 9,382,882 B2 | | 7/2016 | Pursifull |
| 9,458,801 B2 | | 10/2016 | Dudar et al. |
| 9,599,075 B2 | | 3/2017 | Luehrsen et al. |
| 2011/0132311 A1 | * | 6/2011 | Pursifull .......... F02M 35/10229 123/184.56 |
| 2013/0220282 A1 | | 8/2013 | Hadre et al. |

FOREIGN PATENT DOCUMENTS

| | | |
|---|---|---|
| CN | 103362696 A | 10/2013 |
| JP | 2009180095 A | 8/2009 |

OTHER PUBLICATIONS

Anonymous, "An ELCM EVAP Monitor Compensation Method for Canister Loading State," IPCOM No. 000237181D, Published Jun. 6, 2014, 2 pages.

State Intellectual Property Office of the People's Republic of China, Office Action and Search Report Issued in Application No. 201510172502.7, dated May 31, 2018, 15 pages. (Submitted with Partial Translation).

* cited by examiner

METHOD AND SYSTEM FOR FUEL VAPOR MANAGEMENT

CROSS REFERENCE TO RELATED APPLICATION

The present application is a continuation of U.S. patent application Ser. No. 14/252,665, entitled "METHOD AND SYSTEM FOR FUEL VAPOR MANAGEMENT," filed on Apr. 14, 2014, now U.S. Pat. No. 9,797,322. The entire contents of the above-referenced application are hereby incorporated by reference in its entirety for all purposes.

FIELD

The present invention relates to purging of fuel vapors from a fuel system canister in boosted engines.

BACKGROUND/SUMMARY

Vehicle emission control systems may be configured to store fuel vapors from fuel tank refueling and diurnal engine operations in a charcoal canister. During a subsequent engine operation, the stored vapors can be purged into the engine where they are combusted. For example, an intake manifold vacuum generated during engine spinning can be used to draw in the stored fuel vapors. As another example, boosted intake air may be directly or indirectly used to purge the fuel vapors to the engine.

During canister purging, an engine control system may attempt to purge the canister as fast as possible, and also as completely as possible. However, various purging limits may be encountered pertaining to the maintenance of an engine air-fuel ratio as well engine air flow rates. As an example, when the canister is nearly full and/or when ambient conditions are hot, the canister purge rate may be limited to be a fraction of the engine's fuel injection rate. In another example, when the canister is partially full or when ambient conditions are cold, and while the engine is at a low load idle condition, the canister purge rate may be limited based on the amount of air that can be ingested by the engine. As such, if the amount of un-throttled air entering the engine becomes too large, fuel consumption may increase to maintain the engine at stoichiometry. As a further example, when the canister is nearly full and/or when ambient conditions are cold, the canister purge rate may be limited by the flow rate of the canister purge valve. The various limitations enable fuel flow from the canister to the engine intake to be rapidly reduced when the engine air flow rate drops, such as due to a closed throttle event.

However, the inventors herein have recognized that the limitations imposed on the canister purge flow rate can result in insufficient canister purging which degrades exhaust emissions. The inventors have realized that higher purge rates may be applied over a wider range of operating conditions by regulating purge flow to be a defined proportion of intake airflow over the operating conditions. For example, during purging conditions when the canister load is higher, such as when the canister is almost full, higher purge rates can be tolerated due to higher air flow to the engine and higher rates of fuel consumption. During conditions when the canister load is lower, such as when the canister is almost empty, higher purge flow rates can be used to more completely empty the canister without incurring over-fueling issues.

As such, conventionally purge fuel flow rates have been the focus of purge control. However, the inventors have recognized that purge control can be improved by focusing on a normalized purge air-fuel ratio (or phi_purge) instead. Focusing on phi_purge allows a higher net purge flow rate over a given purge period. Accordingly, the first limitation changes to phi_purge, not purge fuel flow rate. The second limitation is then the sum of the purge fuel rate and purge air rate that an engine is able to ingest without unintentionally increasing fuel consumption.

Thus in one example, canister purging can be performed more completely over a larger range of engine operating conditions using a method for an engine, comprising: receiving purge flow from a fuel system canister at each of a first location upstream of a compressor and a second location downstream of an intake throttle, and adjusting the purge flow to be a preselected proportion of total engine fuel. In this way, a ratiometric purge may be enabled.

As an example, during purging conditions, a purge flow through a canister may be adjusted so that the purge fuel vapors constitute a fixed preselected portion, such as substantially 20%, of total engine fuel. As such, the fuel vapor fraction of total engine fuel may be maintained as engine fueling changes with engine load from a minimum engine fueling to a maximum engine fueling. Thus, as the total engine fuel increases or decreases, the purge flow may be correspondingly adjusted. A liquid fueling of the engine from a fuel injector may be adjusted to provide the remaining fuel fraction. As such, the purge flow may be also be affected by the canister load. Thus, to maintain the preselected fuel vapor fraction, a lower purge flow rate may be applied when the canister load is higher, while a higher purge flow rate may be applied when the canister load is lower. In addition, as the canister load decreases, the fuel vapor fraction may decrease, and the liquid fuel fraction may be correspondingly increased to maintain the air-fuel ratio.

A location of the purging may also be adjusted based on operating conditions. Specifically, purge flow may be drawn into a first location upstream of an intake compressor (and upstream of an intake throttle) or a second location downstream of an intake throttle (and downstream of the intake compressor). In some embodiments, a portion of the purge flow may be directed to the first location while a remaining portion of the purge flow is directed to the second location. The routing may be based on engine operating conditions including boost pressure and manifold pressure. When manifold pressure is lower (e.g., high engine loads), engine intake vacuum may be used to draw the purge vapors into the intake downstream of the throttle, while maintaining the purge fuel fraction at the determined proportion. When manifold pressure is higher (e.g., low engine loads), compressor bypass flow may be used to drawn vacuum at an aspirator, the aspirator vacuum used to purge fuel vapors at the determined proportion upstream of the compressor.

During engine operating conditions when engine intake airflow is higher, intake airflow may not be limited and total engine fueling requirement may be higher. Thus, a larger absolute amount of purge fuel vapors may be drawn into the engine downstream of the throttle from a highly loaded canister using intake vacuum, albeit at a lower normalized purge fuel air ratio. Thus when the canister load is higher, and while airflow is not limited (such as while boost is being built), a canister purge valve opening may be increased so that the purge fuel vapors can be drawn into the engine intake, at a location downstream of an intake throttle, via a first purge conduit. As the canister load decreases, and while the engine is still operating unboosted, a higher canister airflow rate is applied to maintain the same purge vapor fuel mass rate or normalized purge fuel air ratio. The increased airflow through the mostly empty canister advantageously warms the canister, improving desorption of fuel vapors from the canister and improving complete purging of the canister. During engine operating conditions when engine load is lower and engine intake airflow is lower, intake airflow may be limited, and the engine may operate boosted. During such conditions, the purging may be directed to the location upstream of the compressor by adjusting the position of an ejector shut-off valve to control motive flow and vacuum generation at the ejector. By varying the ejector vacuum, the purge flow to the upstream location can be adjusted so that the preselected proportion of total engine fueling is provided via the purge flow, with the purge flow rate increased as the canister load decreases. Alternatively, the ejector shut off valve may be an open/shut valve. In this case, a canister purge valve is useful for regulating flow into the ejector's suction port.

In this way, as total engine fueling transitions from a maximum engine fueling condition to a minimum engine fueling condition, a purge flow rate from a fuel system canister and a location of receiving the purge flow may be adjusted so that the purge fuel vapors constitute a fixed pre-selected proportion of the total engine fueling. This approach allows the canister to be gradually purged when it is highly loaded and when the engine fueling rate is higher. The approach further allows the canister to be more completely purged when it is lightly loaded and when the engine fueling rate is lower by flowing more air through the canister. By maintaining the purge flow to be a fixed proportion of total engine fueling, even as engine fueling rates change, a higher purge flow rate can be used at the canister, on average. This allows for a more complete purging of the canister, improving canister adsorption efficiency and exhaust emissions. In addition, by enabling higher purge rates, a larger proportion of the engine fuel can be provided as fuel vapors, reducing the liquid fueling required, and providing fuel economy benefits. By using ratiometric purging, the purge fuel mass rate increases proportionally with total engine fuel mass rate up to the point when the fuel vapor storage system hits a plumbing-related flow limitation. In this case, it is the plumbing that limits further purge flow rate, not the classic "maximum allowed purge fuel mass rate" limitation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
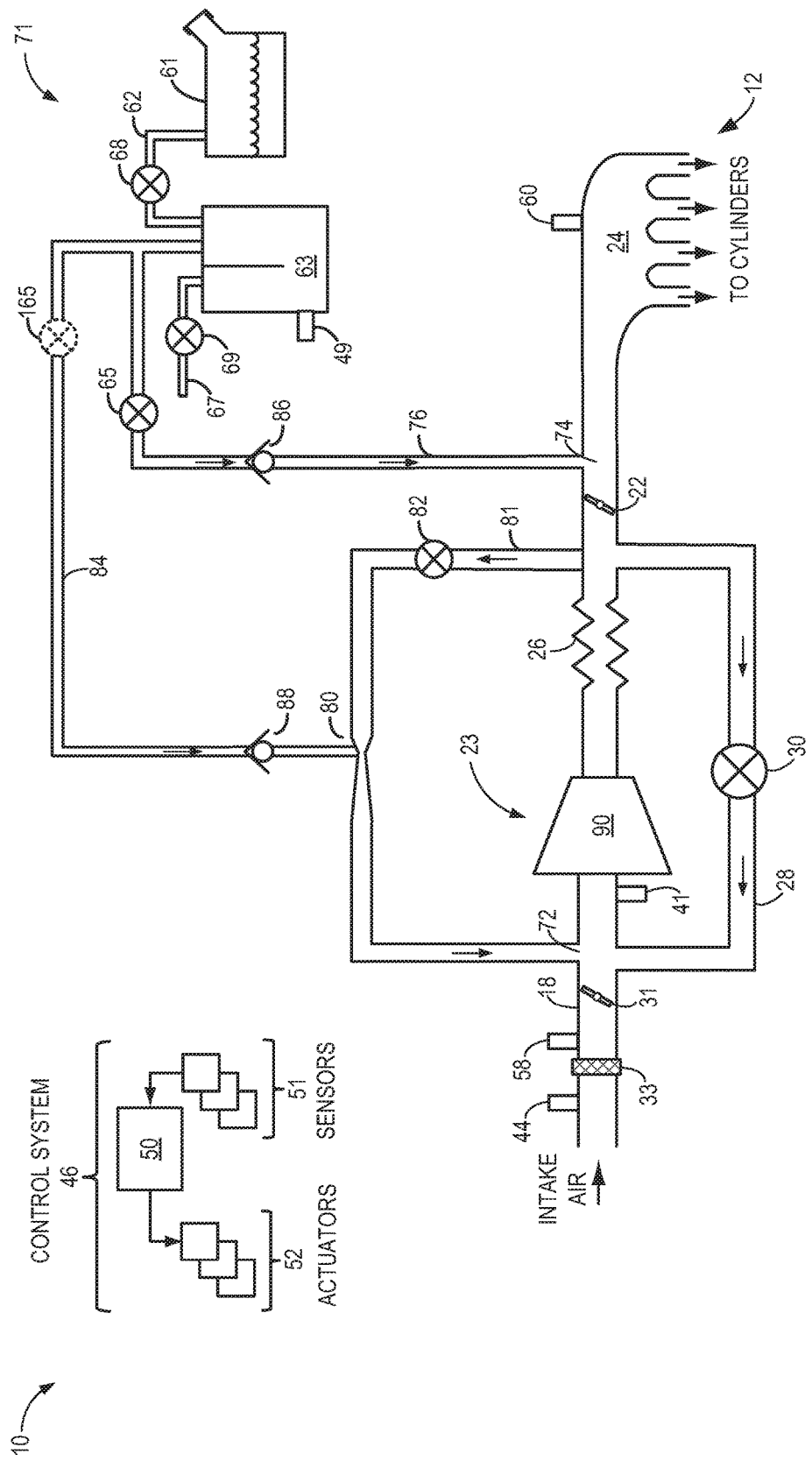
FIGS. 1-3 show example embodiments of an engine system configured for purging of fuel vapors from a fuel system to an engine.
Figure 2:
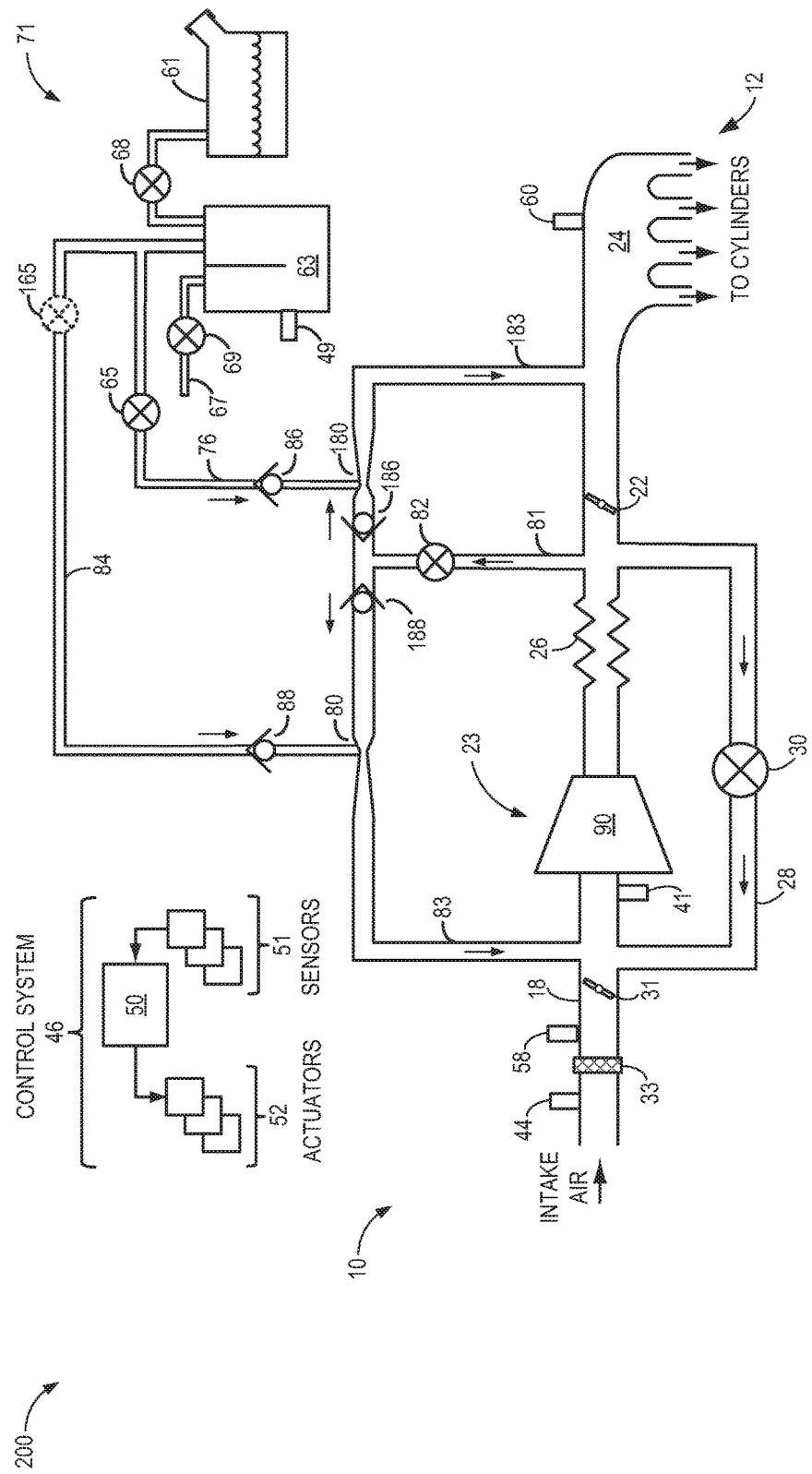
Figure 3:
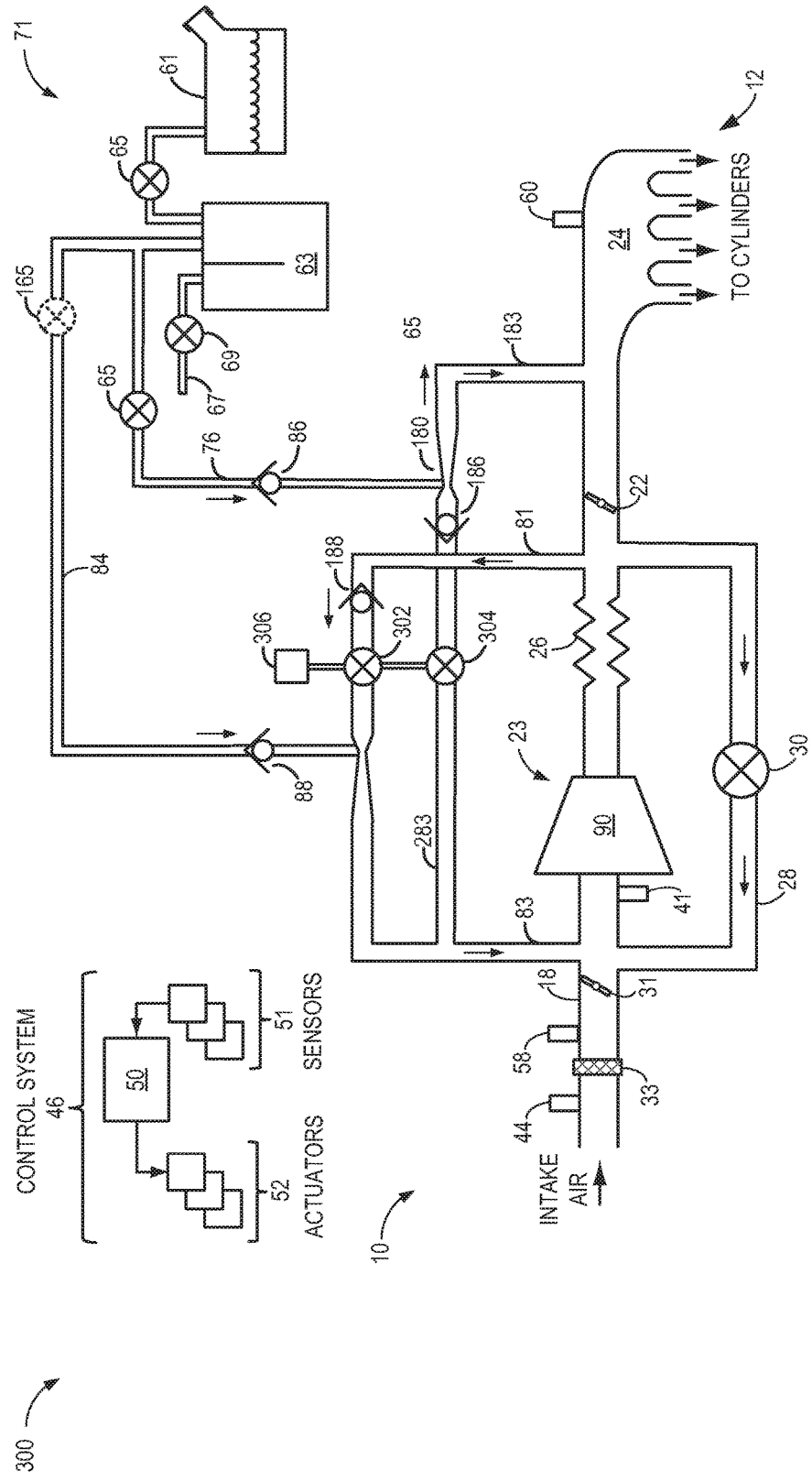
Figure 5:
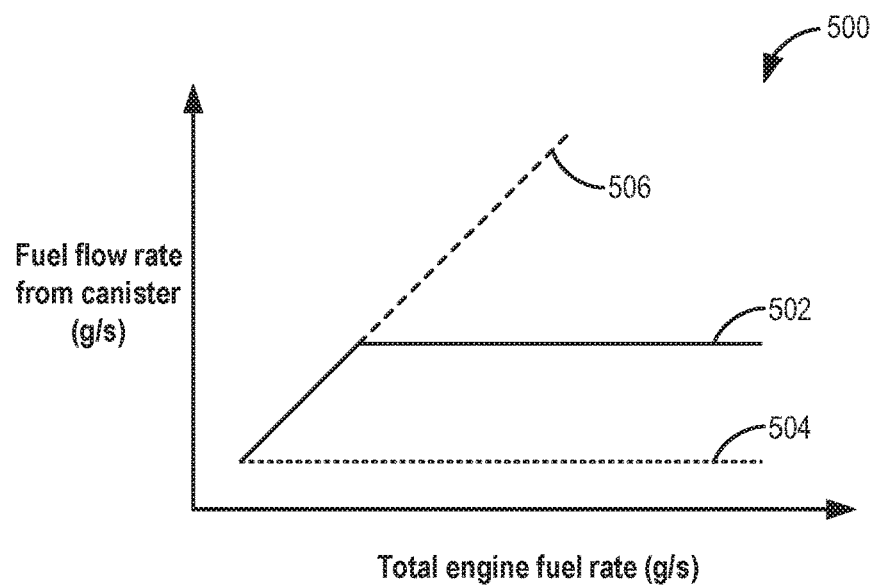
FIGS. 5-6 show an example relationship between purge flow from the canister and total engine fueling, according to the present disclosure.
Figure 6:
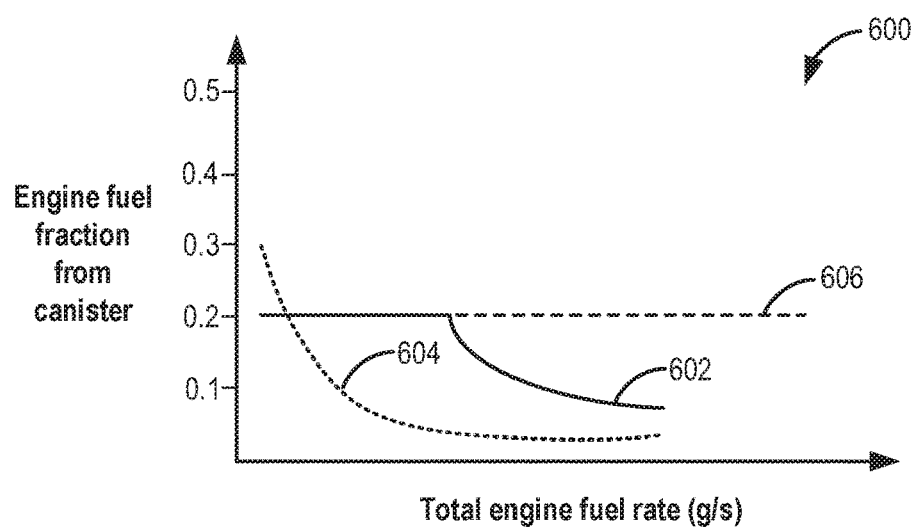
Figure 7:
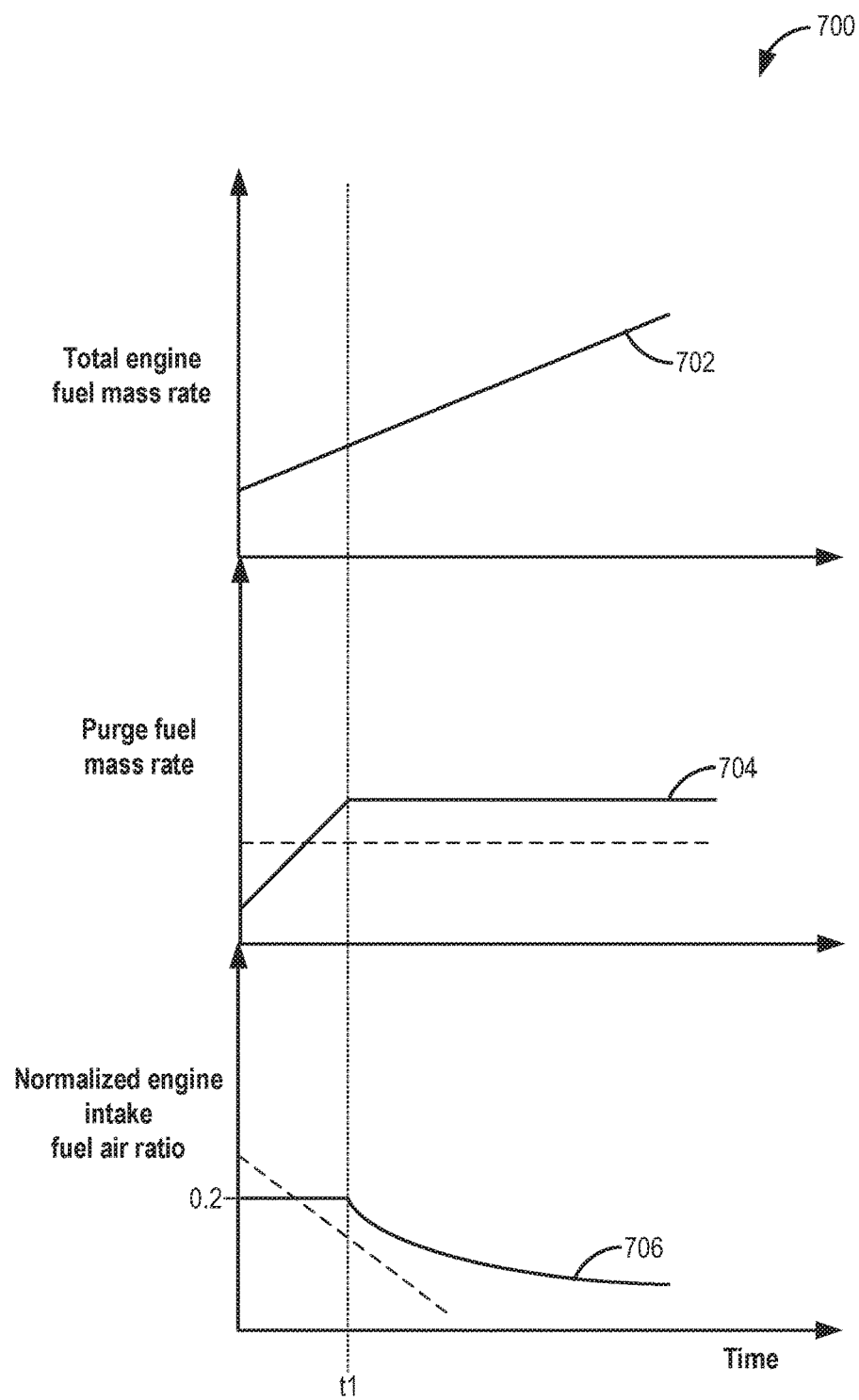
FIG. 7 shows an example canister purging operation, according to the present disclosure.
Figure 8:
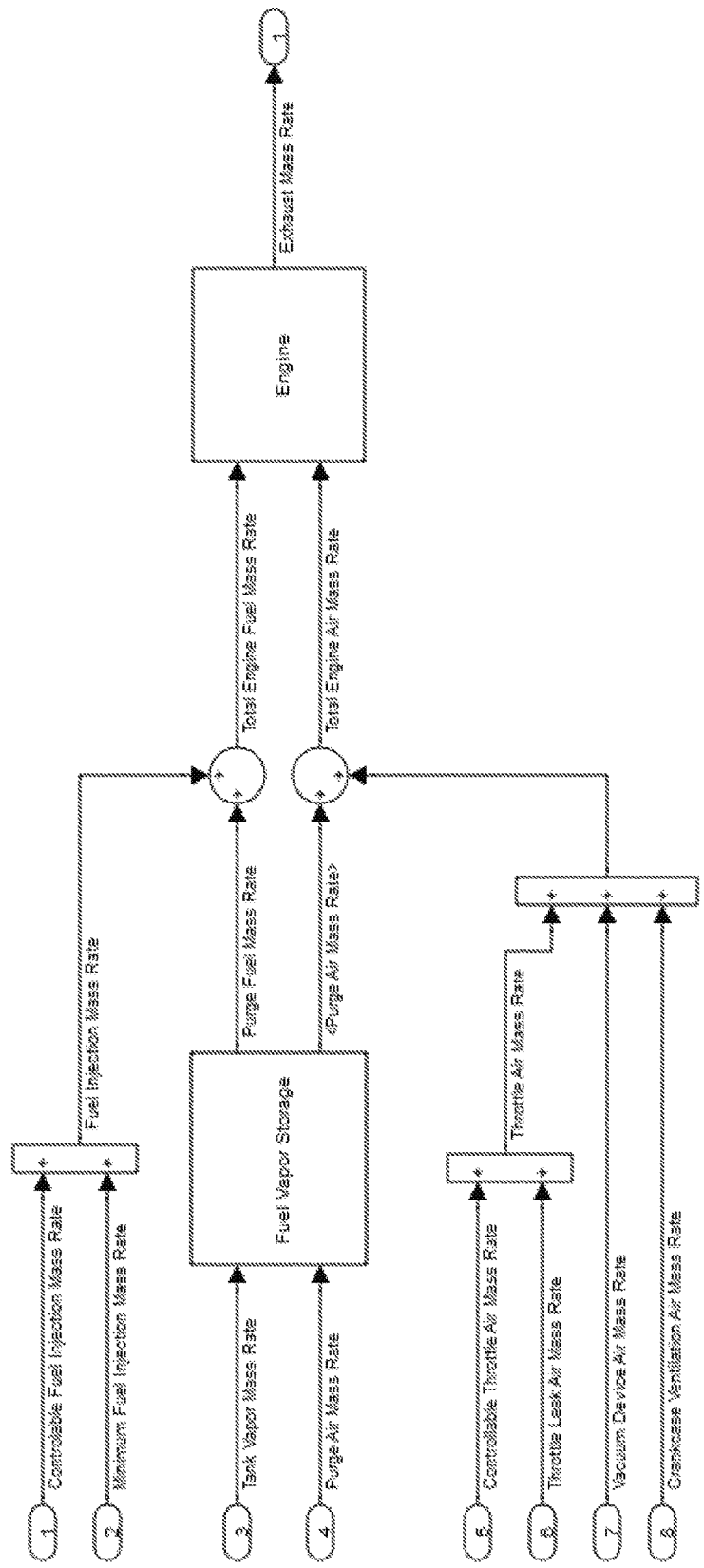
FIGS. 8-9 show example block diagrams for purge air-fuel ratio control.

Methods and systems are provided for improving complete purging of a fuel system canister coupled in an engine system, such as the engine system of FIGS. 1-3. An engine controller may be configured to perform a control routine, such as the example routine of FIG. 4 to adjust purging of the canister as engine operating conditions vary so that a preselected proportion of total engine fueling is provided from purge fuel vapors. In particular, a fuel flow rate from the canister may be varied as canister load varies so that the engine fuel fraction from the canister is maintained around the preselected proportion (FIGS. 5-6). An example canister purging operation is described at FIG. 7. Example block diagrams of purge air-fuel ratio control are shown at FIGS. 7-8.

A description of terms used herein is now provided. As used herein, Total Engine Air Mass Rate is the mass flow rate of air into the engine from all sources including air passing through the fuel vapor storage canister. As used herein, Total Engine Fuel Mass Rate is the mass rate of fuel into the engine from all sources including fuel emanating from the fuel vapor storage canister. As used herein, Purge Air Mass Rate is the mass rate of air entering the canister through the canister vent valve. As used herein, Purge Fuel Rate is the mass rate of fuel exiting the canister and ingested into the engine via the canister purge valve(s). As used herein, Total Engine Fuel/Air Ratio is the Total Engine Fuel Mass Rate/Total Engine Air Mass Rate. As used herein, Normalized Total Engine Fuel/Air Ratio is the Total Engine Fuel/Air Ratio divided by the Stoichiometric Fuel/Air Ratio. This is also referred to herein as phi. As used herein, Purge Fuel/Air Ratio is calculated as Purge Fuel Rate/Purge Air Rate. As used herein, Normalized Purge Fuel/Air Ratio is calculated as Purge Fuel/Air Ratio/Stoichiometric Fuel/Air Ratio. This is also referred to herein as phi_purge.

Turning to FIG. 1, it shows an example engine system 10 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 includes a control system 46. Control system 46 includes a controller 50, which may be any electronic control system of the engine system or of the vehicle in which the engine system is installed. Controller 50 may be configured to make control decisions based at least partly on input from one or more sensors 51 within the engine system, and may control actuators 52 based on the control decisions. For example, controller 50 may store computer-readable instructions in non-transitory memory, and actuators 52 may be controlled via execution of the instructions.

Engine 12 has an engine intake system 23 that includes a main air intake throttle 22 fluidly coupled to an engine intake manifold 24 along an intake passage 18. Air may enter intake passage 18 from an air intake system including an air cleaner 33 in communication with the vehicle's environment. A position of throttle 22 may be varied by controller 50 via a signal provided to an electric motor or actuator included with the throttle 22, a configuration that is commonly referred to as electronic throttle control. In this manner, the throttle 22 may be operated to vary the intake air provided to the intake manifold and the plurality of engine cylinders.

A barometric pressure (BP) sensor 44 may be coupled at an inlet of intake passage 18, e.g. upstream of the air cleaner, for providing a signal regarding barometric (e.g., atmospheric) pressure to controller 50. Additionally, a mass air flow (MAF) sensor 58 may be coupled in intake passage 18 just downstream of air cleaner 33 for providing a signal regarding mass air flow in the intake passage to controller 50. In other examples, MAF sensor 58 may be coupled elsewhere in the intake system or engine system, and further, there may be one or more additional MAF sensors arranged in the intake system or engine system. Further, a sensor 60 may be coupled to intake manifold 24 for providing a signal regarding manifold air pressure (MAP) and/or manifold vacuum (MANVAC) to controller 50. For example, sensor 60 may be a pressure sensor or a gauge sensor reading vacuum, and may transmit data as negative vacuum (e.g., pressure) to controller 50. In some examples, additional pressure/vacuum sensors may be coupled elsewhere in the engine system to provide signals regarding pressure/vacuum in other areas of the engine system to controller 50.

Engine system 10 may be a boosted engine system, where the engine system further includes a boosting device. In the present example, intake passage 18 includes a compressor 90 for boosting an intake air charge received along intake passage 18. A charge air cooler (or intercooler) 26 is coupled downstream of compressor 90 for cooling the boosted air charge before delivery to the intake manifold. In embodiments where the boosting device is a turbocharger, compressor 90 may be coupled to and driven by an exhaust turbine (not shown). Further compressor 90 may be, at least in part, driven by an electric motor or the engine crankshaft.

An optional bypass passage 28 may be coupled across compressor 90 so as to divert at least a portion of intake air compressed by compressor 90 back upstream of the compressor. An amount of air diverted through bypass passage 28 may be controlled by opening compressor bypass valve (CBV) 30 located in bypass passage 28. By controlling CBV 30, and varying an amount of air diverted through the bypass passage 28, a boost pressure provided downstream of the compressor can be regulated. This configuration enables boost control and surge control.

In the embodiment of FIG. 1, a compressor inlet pressure (CIP) sensor 41 is arranged downstream a junction of intake passage 18 and bypass passage 28, and upstream of the compressor. CIP sensor 41 may provide a signal regarding CIP to controller 50.

Engine system 10 further includes ejector 80. Ejector 80 may be an ejector, aspirator, eductor, venturi, jet pump, or similar passive device. Ejector 80 is positioned in a bypass conduit 81 bypassing the compressor. Bypass conduit 81 may be arranged substantially parallel to compressor bypass passage 28. Bypass conduit 81 may include an ejector shut-off valve (ESOV) 82 for controlling motive flow through the ejector. In particular, by adjusting the opening of ESOV 82, compressor recirculation flow from downstream of the charge cooler to the compressor inlet may be varied. For example, ESOV 82 may be actively controlled to allow/disallow motive flow through each Ejector (in the case of a binary ESOV) or to reduce/increase flow through the ejector (in the case of a continuously variable ESOV). Due to the converging-diverging shape of ejector 80 in the depicted example, the flow of air from the motive inlet of the aspirator to the mixed flow outlet of the aspirator may generate a low pressure at the suction tap or neck of the aspirator. The generated vacuum may then be applied to a vacuum consumption device coupled to the aspirator. In the present example, ejector 80 is coupled to a fuel vapor purge system 71 wherein fuel canister 63 is the vacuum consumption device. As elaborated herein, during selected conditions, flow through bypass conduit 81 may be used to generate vacuum at the aspirator which is then used for purging fuel vapors from the fuel canister 63 to the engine intake manifold 24. In alternate examples, the aspirator may be coupled to an additional vacuum consumption devices such as a brake booster vacuum reservoir, a vacuum-actuated valve, such as a vacuum-actuated wastegate, etc.

In the depicted example, ESOV 82 is arranged in bypass conduit 81 upstream of the throat of aspirator 80. However in other embodiments, the ESOV may be arranged downstream of the throat of the aspirator (e.g., in the exit tube or downstream of the exit tube), or the ESOV may be integral to the aspirator (e.g., the valve may be arranged at the throat of the aspirator). One advantage of depicted positioning the ESOV is that when the ESOV is upstream of the aspirator neck, the pressure loss associated with the ESOV has less of an impact as compared to configurations where the ESOV is downstream of the aspirator or where the ESOV is integral to the aspirator.

ESOV 82 may be a solenoid valve which is actuated electrically, and its state may be controlled by controller 50 based on various engine operating conditions. However, as an alternative, the ESOV may be a pneumatic (e.g., vacuum-actuated) valve; in this case, the actuating vacuum for the valve may be sourced from the intake manifold and/or vacuum reservoir and/or other low pressure sinks of the engine system. In embodiments where the ESOV is a pneumatically-controlled valve, control of the ESOV may be performed independent of a powertrain control module (e.g., the ESOV may be passively controlled based on pressure/vacuum levels within the engine system).

Whether it is actuated electrically or with vacuum, ESOV 82 may be either a binary valve (e.g. two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable ESOV may provide greater flexibility in control of the motive flow through the aspirator, with the drawback that continuously variable valves may be much more costly than binary valves. In other examples, ESOV 82 may be a gate valve, pivoting plate valve, poppet valve, or another suitable type of valve.

In the depicted example, bypass passage 28 is provided distinct from bypass conduit 81 including the ejector so that boost pressure and vacuum generation can be controlled independently. For example, during conditions of compressor surge, CBV 30 may be opened so that compressor recirculation is increased via compressor bypass passage 28 to relieve surge. Likewise, compressor recirculation flow through bypass conduit 81 via ESOV 82 may be used to control motive flow through aspirator 80 and vacuum generation for canister purging. As such, a large, sound control flow rate may not be achieved through the restrictive ejector. Therefore, in alternate embodiments, two valves, including a large valve to give a rapid decrease of TIP and a small valve to do both continuous bypass control and function as an ESOV, may be required.

In some embodiments, an optional air induction system (AIS) throttle (not shown) may be included in the intake passage upstream of compressor 90. When included, a position of the AIS throttle may be varied by controller 50 via a signal provided to an electric motor or actuator included with the AIS throttle. In this manner, the AIS throttle may be operated to vary the pressure in the intake passage at the compressor inlet, which in turn may vary a flow rate of compressor recirculation flow in a duct connected to a fuel vapor storage canister.

In the embodiment of FIG. 1, engine system 10 further includes a fuel vapor purge system 71 including a fuel tank 61, which stores a volatile liquid fuel combusted in engine 12. Fuel tank may communicate fuel vapors to fuel canister 63 via a conduit 62 including a fuel tank isolation valve (FTIV) 68. Diurnal and refilling fuel vapors generated in the fuel tank may be vented to canister 63 by opening FTIV 68. During all other conditions, FTIV 68 may be maintained closed. Thus, to avoid emission of fuel vapors from the fuel tank and into the atmosphere, the fuel tank is vented to the atmosphere through adsorbent canister 63. The adsorbent canister may have a significant capacity for storing hydrocarbon-, alcohol-, and/or ester-based fuels in an adsorbed state. For example, the canister may be filled with activated carbon granules and/or an alternate high surface-area material. Nevertheless, prolonged adsorption of fuel vapor will eventually reduce the capacity of the adsorbent canister for further storage. Therefore, the adsorbent canister may be periodically purged of adsorbed fuel, as further described hereinafter.

In the embodiment shown in FIG. 1, engine system 10 may be configured to receive purge flow from fuel tank 61 via one of two purge paths. A first path where purge vapors travel via purge valve 65, check valve 86, and conduit 76 into location 74 and then into intake manifold 74. Purge vapors can also travel via purge valve 165, check valve 88, and conduit 84 into location 72 via ejector 80, wherefrom the purge flow then travels through compressor 90, charge air cooler 26, and throttle 22 into intake manifold 24. That is, at a given time, purge flow is either received at first location 72 or second location 74. Purge flow is received at the second location 74 using engine intake manifold vacuum generated during engine operation via a first purge conduit 76. Thus purge flow is received at the first location during conditions when engine intake airflow is not limited, such as when the engine is operating unboosted and/or at higher engine loads. Purge flow is received at the first location using vacuum drawn at aspirator 80 via second conduit 84. Thus purge flow is received at the second location during conditions when engine intake airflow is limited, such as when the engine is operating boosted. Purge conduit 76 may be arranged substantially parallel to purge conduit 84. During purging to the second location 74, canister purge valve 65 controls a flow of fuel vapors from the canister into the intake manifold along purge conduit 76. In comparison, during purging to the first location 72, aspirator shut-off valve (ASOV) 82 controls a flow of fuel vapors from the canister into the engine intake along purge conduit 84 coupled to a neck of aspirator 80, as will be described below. In some embodiments, a second canister purge valve 165 may be optionally included in second purge conduit 84. In such an embodiment, there may be one purge valve per point of fuel introduction. Purge valve 65 controlling flow through the first purge conduit may be configured as a continuously variable purge valve. In comparison, purge valve 165 may be configured as a simpler and cheaper binary (on/off) valve since purge flow through the second conduit is largely controlled via adjustments to ASOV 82. Accordingly, the fuel vapor purge system may be a vacuum consumer which may request vacuum during both boost conditions and non-boost conditions as needed for purging of fuel vapor stored in the canister.

When purging conditions are met, such as when the canister is saturated, vapors stored in fuel vapor canister 63 may be purged to one or more of the first and second locations. For example, when MAP is lower than barometric pressure (e.g., when the engine is operating at higher loads and/or when boost is not enabled), the canister may be purged to the intake manifold 24 via purge conduit 76 by opening canister purge valve 65. While a single canister 63 is shown, it will be appreciated that any number of canisters may be coupled in engine system 10. In one example, canister purge valve 65 may be a solenoid valve wherein opening or closing of the valve is performed via actuation of a canister purge solenoid. Canister 63 further includes a first vent 67 for routing gases out of the canister 63 to the atmosphere when storing, or trapping, fuel vapors from fuel tank 61. First vent 67 may also allow fresh air to be drawn into fuel vapor canister 63 when purging stored fuel vapors to intake manifold 24 via conduit 76.

While this example shows vent 67 communicating with fresh, unheated air, various modifications may also be used. Vent 67 may include a canister vent valve 69 to adjust a flow of air and vapors between canister 63 and the atmosphere. As shown, a pressure sensor 49 may be coupled to (e.g., arranged in) canister 63 and may provide a signal regarding the pressure in the canister to controller 50. In other examples, pressure sensor 49 may be arranged elsewhere, for example at a junction of conduits 76 and 84. By putting the pressure sensor 49 in the canister, it can measure different pressure features depending on valve positions. For example, with vent valve 69 closed and FTIV 68 open, pressure sensor 49 measures tank pressure. With FTIV 68 closed and vent valve 69 open, pressure sensor 49 gives a delta pressure that is monotonically increasing with purge air volume rate.

A check valve is arranged in each of purge conduits 76 and 84. Specifically, a first check valve 86 is arranged in first purge conduit 76, and a second check valve 88 is arranged in second purge conduit 84. Check valves 86 and 88 may be configured to ensure unidirectional flow of air and fuel vapors from the canister towards the intake manifold, and to prevent backflow of air from the intake manifold towards the canister. While the depicted embodiment shows check valve 88 as a distinct valve, in alternate embodiments, check valve 88 may be integrated into aspirator 80, for example proximal to the suction tap or neck of the aspirator. In the context of aspirator 80, check valve 88 also prevents reverse flow from the intake passage, upstream of the compressor, such as may otherwise occur during conditions when compressor inlet pressure is higher than pressure at the aspirator flow source (in this case, the location downstream of the charge air cooler and upstream of the intake throttle). Therefore, advantageously, this arrangement is designed such that the pressure differential driving motive flow rate through the aspirator may be variable and intermittent (in contrast to an industrial application where the motive flow rate is consistently available).

Purge flow through the various conduits may occur during mutually exclusive conditions. However, there may be conditions where purge flow is received concurrently via both purge paths. At high intake manifold vacuum, all the flow comes through conduit 76. In high boost conditions, all the flow comes through conduit 84. At a narrow condition where there is a shallow intake manifold vacuum and a slight pressurization above ambient at TIP, both paths can be active. When the system goes rapidly from manvac to TIP pressure, one can get a "skip" in the concentration of purge vapor in the inlet air. When the system goes rapidly from TIP pressure to manvac, one can get a "double gulp" in the concentration of purge vapor in the inlet air.

During conditions where purge flow is provided mutually exclusively via the purge paths, selection of whether purge flow is routed via the first purge conduit or the second purge conduit may be based on whether the engine is airflow limited or not, such as may be determined based on boost operation. Thus, when the engine is not operating boosted (or while boost is being built) and while engine airflow is not limited, canister 63 may be purged to the engine intake via first conduit 76. During these purging conditions, when the canister loads are higher, the higher load of the canister can be purged to the intake without incurring fuel or air excursions if the purge flow is maintained as a fixed fraction of the total engine fueling. Thus, at higher canister load conditions, the canister may be purged with a lower purge flow rate. Then as the canister load decreases, the canister may be purged with a higher purge flow rate. Liquid fueling to the engine may be adjusted so that the remainder of total engine fueling is provided as liquid fuel to maintain combustion air-fuel ratio at a desired level, such as at stoichiometry. In comparison, when the engine is operating boosted (or after boost is built) and while engine airflow is limited, canister 63 may be purged to the engine intake via second conduit 84. During these purging conditions, when the canister loads are lower, the lower load of the canister can be purged more completely to the intake without incurring fuel or air excursions if the purge flow is maintained as a fixed fraction of the total engine fueling. Thus, at higher canister load conditions, the canister may be purged with a lower a flow rate, the canister airflow rate increased as the canister load decreases. Liquid fueling to the engine may be adjusted so that the remainder of total engine fueling is provided as liquid fuel to maintain combustion air-fuel ratio at a desired level, such as at stoichiometry.

As such, during near full canister conditions (e.g., when canister load is higher than a threshold), and/or while ambient conditions are warm, the canister effluent composition includes nearly 100% fuel vapor. During such conditions, conventionally, the vaporous fuel rate was limited to be a fraction of the lowest possible injection rate that the engine might assume. The inventors here have recognized that such a strategy may limit the canister purging. Herein, by not limiting the engine injection rate, but instead enabling the desired injection rate to be achieved with a fixed portion of the engine fueling delivered purge fuel vapors and a remaining portion of the engine fuel delivered as liquid fuel, canister purging can be improved without affecting engine performance.

Likewise, during partially full (e.g., half full) canister conditions (when canister load is higher than a lower threshold and below an upper threshold), and/or while ambient conditions are cold, or while the engine is at low load idling conditions, the canister effluent composition includes between 15 to 40% fuel vapor. During such conditions, conventionally, the canister purge rate was limited based on the engine air limit that is allowed to bypass the throttle. This is because if the un-throttled air becomes too large, fuel consumption may increase to maintain stoichiometric air-fuel ratio, resulting in degraded fuel economy. The inventors here have recognized that such a strategy may also limit the canister purging. Herein, by not limiting the canister purge rate based on the air limit, but instead enabling the purge rate to be adjusted with a fixed portion of the engine fueling delivered purge fuel vapors and a remaining portion of the engine fuel delivered as liquid fuel, canister purging can be improved without incurring airflow errors, while also improving fuel economy.

As another example, during nearly empty canister conditions (when canister load is below the lower threshold), and/or while ambient conditions are cold, or while the engine is above engine idling speeds, the canister effluent composition includes between 1 to 10% fuel vapor. During such conditions, conventionally, the canister purge rate was limited by the flow rate of the canister purge valve. As a result, canister purging remained incomplete and the canister may never reach 0% loading. The inventors here have recognized that such a strategy may also limit the canister purging. Instead, by applying a fixed vapor fuel fraction, it results in a higher canister airflow rate when the canister is lightly loaded to maintain a similar fuel flow rate as when the canister is highly loaded. The higher airflow through the lightly loaded canister warms the canister, enabling the canister to give up more fuel vapor than if it were cold, thereby increasing purge completion. Herein, by not limiting the canister purge rate based on the flow rate of the purge valve, but instead by opening the purge valve fully and enabling a much higher purge flow rate while delivering the purge vapors as a fixed portion of the engine fueling, the canister can be purged more completely. Even though higher purge rates are used during such conditions, the low load of the canister reduces over-fueling concerns.

Thus, as elaborated herein, by using multiple (two or more) valves between the canister and the different vacuum sources (the engine intake vacuum or aspirator vacuum), the canister can be purged in two phases. During the first phase, when the canister is highly loaded, the canister can be purged at a slower rate with lower airflow through the canister. Then, during the second phase, a rush of air can be introduced into the canister when it is largely empty, allowing the canister to be effectively fully emptied on the purge cycle, improving subsequent fuel canister performance. The higher airflow through the canister during the lightly loaded condition results in a small fuel evaporation effect which is masked by a much larger warming effect of ambient air going across the canister. Thus, the flow of air through the canister warms it up to ambient conditions, improving fuel vapor desorption from the canister, and thereby canister purging.

FIGS. 2-3 show alternate embodiments 200, 300 of the engine system 10 of FIG. 1. As such, components previously introduced in FIG. 1 are numbered similarly in FIGS. 2-3 and not re-introduced for reasons of brevity.

FIG. 2 shows an example embodiment 200 wherein purge flow from the canister along each of the first and second purge conduits is drawn via an ejector. As such, this is because the engine may be better able to handle purge flow coming through an ejector (as compared to directly) because an ejector enhances the manifold vacuum and increases the maximum purge flow (air & vapor combined) capability through conduit 76. In particular, purge flow along first conduit 76 is drawn into aspirator 180 before being drawn via purge conduit 183 into intake manifold 24 at the throttle outlet. Check valve 186 is included in purge conduit 183 to prevent reverse flow of vapors towards the canister as well as to prevent flow of purge fuel vapors into purge conduit 81 and towards the compressor inlet. Likewise purge conduit 81 may include a further check valve 188 to prevent the reverse flow of vapors towards the canister as well as to prevent flow of purge fuel vapors into purge conduit 183 and towards the throttle outlet.

In the depicted embodiment, during conditions when pressure at point 180 is lower than atmospheric pressure, such as when the engine intake airflow is not limited, the canister may be purged by opening canister purge valve 65 and drawing fuel vapors into the intake manifold, downstream of throttle 22, via purge conduit 76, then through aspirator 180, and then via purge conduit 183. The purge flow rate may be adjusted so that the fuel vapors constitute a preselected proportion of the total engine fueling, even as engine fueling changes. For example, the purge fuel vapors may be adjusted to be a maximum of 20% of total engine fueling. Thus, at higher canister load conditions, the canister may be purged with a lower purge flow rate, and then as the canister load decreases, the canister may be purged with a higher purge flow (air & vapor combined) rate. In each case, liquid fueling to the engine may constitute the remainder of total engine fueling to maintain combustion air-fuel ratio at a desired level, such as at stoichiometry.

In comparison, when the manifold pressure is higher than atmospheric pressure, such as when the engine is operating boosted, and while intake airflow is limited and engine intake vacuum is not available, the canister may be purged by opening canister purge valve 165 and ESOV 82 and drawing fuel vapors into the intake manifold, upstream of compressor 90, via purge conduit 84, then through aspirator 80, and then via purge conduit 83. The purge flow rate may be adjusted so that the fuel vapors constitute a preselected proportion of the total engine fueling, even as engine fueling changes. For example, the purge fuel vapors may be adjusted to be 20% of total engine fueling. Thus, at higher canister load conditions, the canister may be purged with a lower purge flow rate, and then as the canister load decreases, the canister may be purged with a higher purge flow rate. In each case, liquid fueling to the engine may constitute the remainder of total engine fueling to maintain combustion air-fuel ratio at a desired level, such as at stoichiometry.

FIG. 3 shows another example embodiment 300 wherein purge flow from the canister along each of the first and second purge conduits is drawn via an ejector, as in FIG. 2. In embodiment 300, flow through purge conduit 76 and then through conduit 183 is adjusted via adjustments to canister purge valve 65 and ASOV 304. Flow through purge conduit 84 and then through conduits 81 and 83 is adjusted via adjustments to canister purge valve 165 and ASOV 302. However, ASOV 302 and 304 are coupled to each other and actuated via a common actuator 306. By actuating common actuator 306, one of ASOV 302 and 304 may be opened while the other one is closed. For example, when the engine is operating un-boosted, ASOV 304 may be opened to enable canister purging to the throttle outlet via aspirator 180. As another example, when the engine is operating boosted, ASOV 302 may be opened to enable canister purging to the compressor inlet via aspirator 80. One advantage of two valves is that the check valves become redundant and thus can be eliminated for a cost save and a pressure restriction save.

Figure 9:
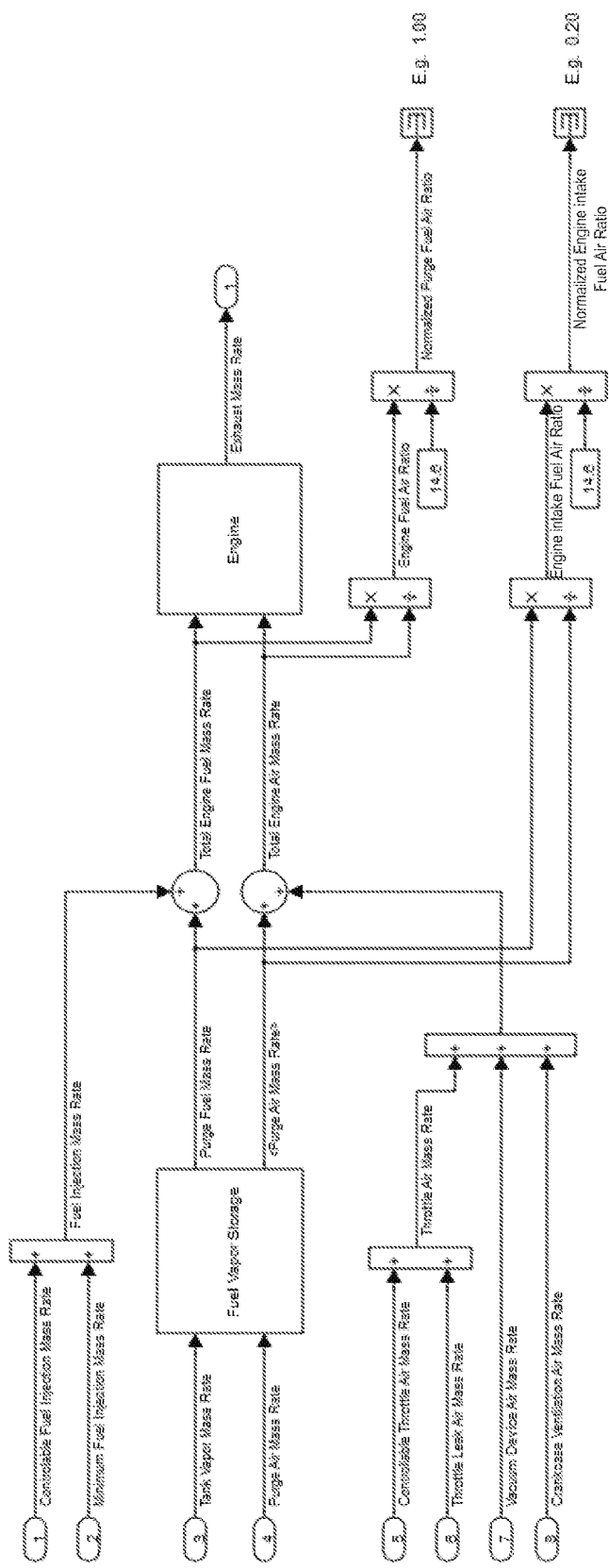

While FIGS. 1-4 show a plumbing schematic of the fuel system, FIGS. 8-9 show a "conservation of mass" graphic. This is reflective of a conceptual technique called a "control volume" which is a pivotal diagramming practice in thermodynamics.

FIGS. 8-9 depict a graphical form of the arithmetic that governs the various flow rates within any purge system. Although the two flows exiting the "Fuel Vapor Storage" block are shown as distinct, they are in fact mixed. But considering them separately helps illustrate the concept of controlling their ratio instead of the conventional practice of only accounting for fuel vapor mass flow rate.

FIGS. 8-9 show that the Fuel Injection Mass Rate has two components: the part that can be controlled (Controllable Fuel Injection Mass Rate) and the part that represents the least fuel one can get if the injectors are on at all (Minimum Fuel Injection Mass Rate). Similarly for air, there is the controllable portion of the air (Controllable Throttle Air Mass Rate) which the throttle has authority to alter and there is the flow that is not controlled by the PCM (Throttle Leak Air Mass Rate, Vacuum Device Air Mass Rate, Crankcase Ventilation Air Mass Rate).

The fuel stream (Total Engine Fuel Mass Rate) and the air stream (Total Engine Air Mass Rate) enter the engine and are nearly fully combusted, producing the exhaust stream (Exhaust Mass Rate).

The objective of every automotive engine with a three-way catalyst is to control the fuel/air ratio into the engine to stoichiometric fuel-air ratio. This is highlighted in FIG. 9 where the reciprocal of lambda (or phi) is 1. The key concept in the subject invention is to target a given fuel/air ratio in the "air" ducting leading to the engine's intake ports. FIG. 9 shows the normalized fuel air ratio here is, by way of example, 0.20 or 20%. This leaves the injection system to pick up the remaining 80%.

This diagram is key to understanding the limits of the system. First, there cannot be less air than Throttle Leak Air Mass Rate+Vacuum Device Air Mass Rate+Crankcase Ventilation Air Mass Rate. Second, there cannot be less fuel than the Controllable Fuel Injection Mass Rate. Finally, the canister purge valve limits the sum of Purge Fuel Mass Rate and Purge Air Mass Rate.

In summary, by focusing on controlling to a target normalized fuel air ratio in the inlet air ducting (ahead of the intake ports), the engine can be made to consume fuel vapor at a high rate, and that is the key to purging the canister during the Federal Test Procedure.

Maps 500 and 600 of FIGS. 5 and 6, respectively, explain how by using a fixed target fuel ratio, instead of a fixed target fuel flow rate for purge fuel vapors, a more complete canister purging may be enabled.

Map 500 of FIG. 5 depicts changes to a fuel flow rate from the canister along the y-axis in relation to change in total engine fuel rate along the x-axis. Ideally, to purge the canister, a purge profile depicted by dashed line 506 may be desired wherein the fuel flow rate from the canister increases as the engine fueling requirement increases. Conventionally, however, a purge profile depicted by dotted line 504 is used wherein a fixed purge flow rate is applied. The purge flow rate is not constant, but the fuel portion of the purge flow rate is constant (i.e. constant purge fuel mass rate). The purge fuel rate is limited (e.g., to 40% of a minimum engine fuel flow rate) so that if the engine goes to a closed throttle at any time (which results in a very flow air and fuel flow rate to the engine), the fuel injectors can meter at least 60% of the fuel during such conditions. The inventors here have recognized that by using a purge profile as depicted by solid line 502, purging efficiency can be improved. The conventional purge profile 504 was brought about by the thought that the purge system was architected to give a constant fuel flow rate, instead of being nimble about fuel flow rate. The new purge profile factors in that the fuel vapor purge system is out to control to a target fuel vapor concentration in the inlet duct (perhaps 20 or 40% of the stoichiometric need of the engine). Specifically, by setting a variable fuel flow rate from the canister, a preselected proportion, herein depicted as 20%, of the fuel delivered to the engine may be sourced from the fuel vapor system. By setting a fuel fraction in the intake air, over-fueling is avoided even if the engine suddenly goes to a closed throttle. Essentially, at any given time, and under all operating conditions, the engine controller knows that a given fraction of the total engine fuel has already been mixed into the engine intake air and the injection system need only provide the remaining fuel fraction. As such, the fuel vapor system encounters multiple fuel rate limits. In this approach, even if the purge vapor fuel fraction in the intake air in reduced below the preselected 20% ratio, the absolute flow rate is enhanced. Thus, at higher canister loads, a lower purge flow rate is used to maintain the preselected fuel fraction from the canister. In comparison, at lower canister loads, a higher purge flow rate is used to maintain the preselected fuel fraction from the canister.

The same is depicted at map 600 of FIG. 6. Map 600 depicts changes to an engine fuel fraction from the canister along the y-axis in relation to change in total engine fuel rate along the x-axis. Ideally, to reduce air-fuel errors, a purge profile depicted by dashed line 606 may be desired wherein the fuel fraction from the canister remains substantially constant even as engine fueling rates vary. Conventionally, however, a purge profile depicted by dotted line 604 is used wherein the engine fuel fraction and purge flow rate is limited as the engine fueling rate increases. As a result, a progressively smaller fraction of the total engine fueling is provided by purge vapors as the engine fueling requirement increases. The inventors here have recognized that by using a purge profile as depicted by solid line 602, engine fueling and purging efficiency can be improved. Specifically, by allowing a fuel flow rate from the canister to vary while maintaining the engine fuel fraction from the canister substantially constant, for at least a range of engine fueling rates, the preselected proportion, herein depicted as 20% (0.2), of the fuel delivered to the engine may be sourced from the fuel vapor system and accounted for. This allows the canister to be purged to the engine intake with a lower purge flow rate when the canister is more loaded, and then purged to the engine intake with a higher purge flow rate when the canister is more loaded (and when less engine fueling is required).

For example, by setting a fixed target fuel ratio and a variable purge rate, the fuel vapor system can maintain up to a 60:1 air-fuel ratio in the engine inlet air, leaving the fuel injection system responsible for taking the air-fuel ratio to the stoichiometric 14.7:1 ratio needed for three-way catalyst function. This results in a situation where air-fuel excursions are minimized since the controller is already appraised of the fuel fraction already present in the air received at the engine intake manifold. Since the balance is always above 60%, it thus follows that the injectors are always injecting at least 60% of the required fuel rate, thereby also satisfying the minimum injector pulse-width requirement.

Figure 4:
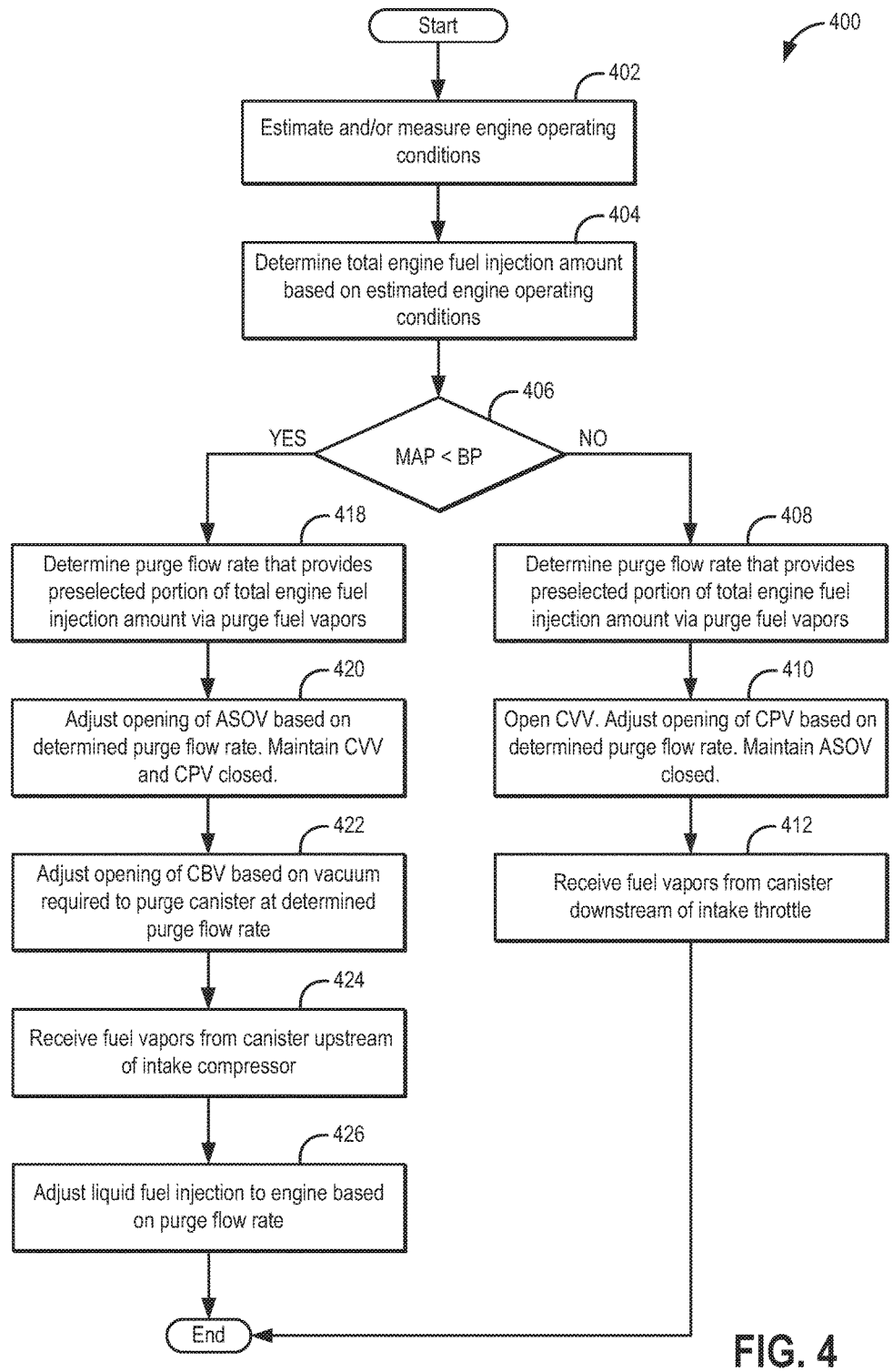
FIG. 4 shows an example method for adjusting a fuel flow rate from the canister to an engine intake so that the purge vapors make up a preselected proportion of the total engine fueling.

Now turning to FIG. 4, an example routine 400 is shown for adjusting canister purge flow as engine fueling changes so that canister purge flow is maintained at a preselected proportion of total engine fuel. By varying the location of purging and the vacuum source, the canister can be more completely purged without limiting engine air or fueling.

At 402, the routine includes estimating and/or measuring engine operating conditions. These may include, for example, engine speed and load, operator torque demand, engine temperature, boost level, ambient conditions (e.g., ambient temperature and pressure), EGR, etc. At 404, based on the estimated engine operating conditions, a total engine fuel injection amount may be determined. As such, the total fuel injection amount may include a total amount of fuel to be delivered as liquid fuel via a fuel injector and fuel vapor to be delivered as canister purge fuel vapors.

At 406, it may be determined if manifold pressure (MAP) is below BP. As such, MAP may be below BP during conditions when the compressor is not enabled, or when boost is being built up (but has not reached a threshold boost pressure). During conditions when MAP is below BP, engine airflow may not be limited and there may be sufficient engine intake vacuum to drawn in purge flow from the canister.

If MAP is determined to be below BP, then at 408, the routine includes determining a purge flow rate that provides a preselected portion of the determined total engine fuel injection amount via purge fuel vapors. In one example, the preselected proportion includes substantially 20% of the total engine fuel being provided via fuel vapors. As such, the purge flow rate may be based on the total engine fueling and further based on the existing canister load. For example, at higher canister loads, a smaller purge rate may be applied, the purge flow rate increased as the engine fueling increases, and/or as the canister load decreases.

At 410, the routine includes opening the canister vent valve (such as vent valve 69 of FIGS. 1-3) and opening the purge valve coupled to the second purge conduit (such as purge valve 65 of conduit 76). The opening of the purge valve may be adjusted based on the determined purge flow rate. For example, at higher canister load conditions, the purge valve may be opened less and the canister may be purged with a lower purge flow rate. Then as the canister load decreases, the purge valve may be opened more and the canister may be purged with a higher purge flow rate. The purge flow rate may be varied with the canister load and with the engine fueling so that the purge fuel vapors constitutes no more than the preselected portion (e.g., 20%) of total engine fueling. This means that at higher canister load conditions, even if higher purge flow rates are possible, the purge flow rate is limited to an amount that enables no more than the preselected portion of engine fuel to be delivered as fuel vapors. In comparison, at lower canister loads, the airflow rate through the canister is increased while the fuel fraction may decrease from the 20% value as the canister empties. As such, during the purging of the canister via the second purge conduit, the ASOV coupled to the canister in the first purge conduit may be maintained closed. In embodiments where purging via the second conduit includes purging via an aspirator coupled to the purge conduit, a corresponding ASOV, such as ASOV 304 of FIG. 3, may also be opened.

At 412, the routine includes receiving purge flow from the fuel system canister at the second location, downstream of the intake throttle (that is, at the throttle outlet) using engine intake vacuum via a canister purge valve. At 426, the routine further includes adjusting engine liquid fueling based on the purge flow to maintain engine combustion at or around a desired combustion air-fuel ratio, such as at or around stoichiometry. For example, 80% of the total engine fueling required may be provided as liquid fuel via a cylinder fuel injector. Thus, as the canister load decreases, and less than 20% of the engine fueling is provided by the purge flow, the engine liquid fueling is correspondingly increased to maintain the air-fuel ratio at the desired ratio.

Returning to 406, if MAP is determined to be above BP, such as when the compressor is enabled and the engine is operating boosted, it may be determined than the engine is airflow limited, and that there may not be sufficient engine intake vacuum to drawn in purge flow from the canister. Accordingly, at 418, the routine includes determining a purge flow rate that provides a preselected portion of the determined total engine fuel injection amount via purge fuel vapors. In one example, the preselected proportion includes substantially 20% of the total engine fuel being provided via fuel vapors. As such, the purge flow rate may be based on the total engine fueling and further based on the existing canister load. For example, at lower canister loads, a higher purge rate may be applied, the purge rate decreased as the engine fueling increases, and/or as the canister load increases.

It will be appreciated that in some examples, a controller may optionally close ESOV 82 during boost build to enhance boost build. Once the proper boost level is attained, the controller may then open ESOV 82. Likewise, the controller may optionally close ASOV 304 during high intake manifold vacuum if leaving this air path open would otherwise result in more air than desired entering the intake manifold.

At 420, the routine includes opening the ASOV coupled to the aspirator in the first purge conduit (such as purge conduit 84 of FIGS. 1-3). The opening of the ASOV may be adjusted based on the determined purge flow rate. In embodiments where the first purge conduit further includes a binary purge valve (such as purge valve 165 of FIGS. 1-3), the optional purge valve may also be opened. For example, at higher canister load conditions, the ASOV may be opened less and the canister may be purged with a lower purge flow rate. Then as the canister load decreases, the ASOV may be opened more and the canister may be purged with a higher purge flow rate. The purge flow rate may be varied with the canister load and with the engine fueling so that the purge fuel vapors constitutes no more than the preselected portion (e.g., 20%) of total engine fueling. This means that at higher canister load conditions, even if higher purge flow rates are possible, the purge flow rate is limited to an amount that enables no more than the preselected portion of engine fuel to be delivered as fuel vapors. In comparison, at lower canister loads, the airflow rate through the canister is increased while the fuel fraction may decrease from the 20% value as the canister empties. As such, during the purging of the canister via the first purge conduit, the vent valve and purge valve coupled to the canister in the second purge conduit may be maintained closed.

At 422, while purging the canister via the first purge conduit, an opening of a compressor bypass valve arranged in a compressor bypass passage substantially parallel to the first purge conduit may be adjusted based on the vacuum required to purge the canister at the determined purge flow rate. By varying the opening of the compressor bypass valve, the compressor inlet and outlet pressures may be varied, which in turn affects the amount of motive flow directed through the aspirator. As one example, the opening of the compressor bypass valve may be decreased to increase the compressor outlet pressure and decrease the compressor inlet pressure, thereby increasing motive flow through the aspirator, as well as vacuum generated at the aspirator. The generated vacuum is then applied to the fuel system canister for canister purging.

At 424, the routine includes receiving purge flow from the fuel system canister at the first location, upstream of the intake compressor (that is, at the compressor inlet) using vacuum generated at an aspirator coupled in a compressor bypass path. In some embodiments, purge flow may be received at each of the first and second location simultaneously. The amount of purge flow received at the first location relative to the second location may be based on engine operating conditions including manifold pressure (MAP), boost pressure and/or canister load. As an example, a higher amount of purge flow may be received at the first location when the manifold pressure is higher (than barometric pressure), when the boost pressure is higher (or while boost is enabled) or when canister load is lower, such as when the canister is nearly empty or less than half full. In particular, ejector 80 sucks with the biggest flow when boost is high (assuming purge valve 165 and vent valve 69 are open). Aspirator 180 sucks with the biggest flow when manifold vacuum (manvac) is deep (assuming purge valve 65 and vent valve 69 are open).

At 426, the routine further includes adjusting engine liquid fueling based on the purge flow to maintain engine combustion at or around a desired combustion air-fuel ratio, such as at or around stoichiometry. For example, 80% of the total engine fueling required may be provided as liquid fuel via a cylinder fuel injector. As elaborated before, as the canister load decreases, and less than 20% of the engine fueling is provided by the purge flow, the engine liquid fueling is correspondingly increased to maintain the air-fuel ratio at the desired ratio.

In this way, purge flow is received from a fuel system canister at each of a first location upstream of a compressor, and a second location downstream of an intake throttle at mutually exclusive conditions. Further, across the mutually exclusive conditions, the purge flow is maintained at a preselected proportion (e.g., substantially 20%) of total engine fueling even as the total engine fueling changes from a minimum engine fueling level to a maximum engine fueling level. As discussed above, receiving purge flow at mutually exclusive conditions includes receiving the purge flow downstream of the intake throttle during a first condition when manifold pressure is below barometric pressure (that is, the engine is un-boosted), while receiving the purge flow upstream of the compressor during a second condition mutually exclusive to the first condition when manifold pressure is above barometric pressure (that is, the engine is boosted). During the first condition, the purge flow is received in the intake manifold using intake vacuum, while during the second condition, the purge flow is received in the intake manifold using vacuum generated at an aspirator coupled in a compressor bypass path. The rate of purge flow is adjusted during the first condition by adjusting an opening of a purge valve, the opening of the purge valve based on intake airflow and canister load. In comparison, the rate of purge flow is adjusted during the second condition by adjusting an opening of an aspirator shut-off valve, the opening of the aspirator shut-off valve based on canister load. During both conditions, the purge flow rate is adjusted based on canister load so as to maintain the purge flow at the preselected proportion. Consequently, during both conditions, the purge flow is decreased as the canister load increases, and the purge flow is increased as the canister load decreases.

A controller may transition the purging between the mutually exclusive conditions while continuously maintaining the purge flow at the preselected proportion immediately before and immediately after the transition. At high intake manifold vacuum, all the flow comes through first purge conduit 76. In high boost, all the flow comes through second purge conduit 84. At a narrow condition where there is a shallow intake manifold vacuum and a slight pressurization above ambient at TIP, both paths can be active and purge flow is received via each of the first purge conduit and the second purge conduit. When the system goes rapidly from manifold vacuum to TIP pressure, one can get a "skip" in the concentration of purge vapor in the inlet air. When the system goes rapidly from TIP pressure to manifold vacuum, one can get a "double gulp" in the concentration of purge vapor in the inlet air.

Now turning to FIG. 7, an example canister purging operation is described at map 700. In particular, map 700 depicts total engine fuel mass rate at plot 702, purge fuel mass rate at plot 704, and normalized engine intake fuel air ratio at plot 706. All plots are depicted over time along the x-axis.

Canister purging is initiated at t0 and performed ratiometrically at 20% of total engine fueling. The conventional approaches are shown as dashed lines. Thus, until t1, the total engine fuel mass rate increases with time, with purge fuel mass rate being increased to 20% by t1. At the same time, normalized engine intake fuel air ratio is correspondingly adjusted as the purge fuel mass rate increases.

At t1, the system cannot supply a further purge fuel rate for one of two reasons. First, due to the canister loading being lower. And second, due to engine having insufficient manifold vacuum, or due to the canister reaching its flow limit, or due to other plumbing restrictions. Thus, after t1, purge fuel rate is maintained at 20% until the canister is fully emptied.

In this way, a mixture of fuel vapors and air is purged from a canister into a first or second position in an air intake of an engine. A controller determines fuel vapor flow rates through the first or second positions and delivers a liquid fuel to the engine while limiting the flow of the purge mixture when the fuel vapor reaches a preselected proportion of a total of the liquid fuel and the fuel vapor. The preselected proportion may be substantially 20 percent. Herein, the liquid fuel is delivered at a flow rate to maintain a total of the liquid fuel flow rate and the vapor flow rate at a desired value, such as at a stoichiometric value. In one example, the fuel vapor flow rates are determined from air-fuel ratio control responsive to one or more exhaust gas oxygen sensors positioned in an exhaust of the engine, or sensors positioned in a purge flow path. Purging to the first or second position is selected based on engine operating parameters, such as boost pressure and canister load.

In another example, an engine system comprises: an engine including an intake; an intake throttle; an intake compressor; a compressor bypass path including a valved aspirator; a fuel system canister; a first purge conduit coupling the canister to the engine intake via a canister purge valve; and a second purge conduit coupling the canister to the engine intake via the valved aspirator. The engine system further includes a controller with computer readable instructions for: selectively purging the canister to the engine intake via one of the first conduit and the second conduit, the selection based on manifold pressure; and limiting a purge flow received in the engine intake to be a predefined proportion of engine fuel. The purge flow includes fuel vapor flow, and limiting the purge flow includes adjusting the purge flow so that a total of fuel vapor flow and liquid fuel received in the engine intake is at or around stoichiometry. The predefined proportion may include a maximum of 20% purge. Selectively purging may include purging via the first conduit at lower manifold pressure and purging via the second conduit at higher manifold pressure. Purging via the first conduit includes opening the canister purge valve to purge to the engine intake using intake vacuum, downstream of the intake throttle, and purging via the second conduit includes opening a valve of the valved aspirator to purge to the engine intake using aspirator vacuum, upstream of the intake throttle, and upstream of the intake compressor. Purging via the second conduit may further include opening a compressor bypass valve coupled in the compressor bypass path. The selective purging may be further based on engine load, the canister purged via the first conduit at higher engine load and purged via the second conduit at lower engine load.

In another representation, a method of canister purging comprises: controlling an air flow rate into an engine to achieve an operator demand for power, the air flow rate provided from a compressor or from induction by the engine through a throttle. The method further includes purging a mixture of fuel vapors and ambient air from a fuel vapor storage canister, and dependent upon engine operating conditions, routing said purged mixture into a position upstream of said air compressor, or into another position downstream of said compressor, or into positions partially upstream and partially downstream of said compressor. The method further includes determining fuel vapor flow rates downstream or upstream of said compressor from an indication of flow rate of said purge mixture and an indication of fuel vapor content of said purge mixture; and delivering a liquid fuel to the engine at a flow rate to achieve a substantially stoichiometric air-fuel ratio of a total of said controlled air flow entering said engine and said ambient air in said purge mixture entering said engine to a total of said liquid fuel and said fuel vapor entering said engine. The method then limits flow of said purge mixture when said fuel vapor flow rate reaches a preselected proportion of said liquid fuel flow rate and said fuel vapor flow rate. Herein, controlling airflow rate comprises controlling a bypass around said compressor or controlling said throttle. Further, the fuel vapor storage canister is coupled to a fuel tank and said purging commences under entry conditions including engine coolant temperature. The engine operating conditions that determine the routine may include one or more of pressure in a manifold coupled between said throttle and intake valves of said engine; ambient pressure; or boost pressure. The compressor may be included in a turbocharger and may be driven by a turbine coupled to an exhaust of the engine. The delivered liquid fuel to achieve the stoichiometric air/fuel ratio is determined in part by feedback from at least one exhaust gas oxygen sensor coupled to an exhaust of said engine. The determined fuel vapor flow rate may be determined in part from the feedback. In some embodiments, a first purge control valve may be placed between the canister and the position upstream of said compressor. Further, a second purge control valve may be placed between the canister and the position downstream of the compressor. In a further example, the purge mixture is routed to the position downstream of the compressor under high engine load conditions, and routed to the position upstream of the compressor under low engine load conditions, and routed to both of said positions concurrently when high rates of purge are desired. The higher rates of purge may be desired when the canister is not highly loaded with the purge vapors.

In still another representation, the method comprises: during a first condition, when intake manifold vacuum is higher than a threshold vacuum, purging the canister to an engine intake, downstream of an intake throttle, using intake vacuum; and during a second condition, when boost pressure is higher than a threshold pressure, purging the canister to the engine intake, upstream of a compressor, using vacuum generated at an aspirator coupled in a compressor bypass path. During the first condition, purge flow is received in the engine intake via a first conduit including a purge valve and not including an aspirator, while during the second condition, purge flow is received in the engine intake via a second conduit including the aspirator and not including a purge valve. During the first condition, manifold pressure is lower than barometric pressure, and during the second condition, manifold pressure is higher than barometric pressure. Further, during each of the first and second conditions, purge flow is adjusted to be a preselected proportion of total engine fuel, the total engine fuel based on engine airflow. The preselected proportion may be substantially 20% of total engine airflow. Herein, purging the canister to the engine intake during the first condition includes opening a canister purge valve, the canister purge valve opening based on intake airflow and canister load, and purging the canister to the engine intake during the second condition includes opening an aspirator valve coupled upstream of the aspirator in the compressor bypass path, the aspirator valve opening based on the intake airflow and canister load. The canister purge valve opening and the aspirator valve opening is increased as the canister load falls below the threshold. Further, during a third condition, purge flow is received in the engine intake via each of the first conduit including the purge valve and via the second conduit including the aspirator. The third condition may include manifold vacuum being lower than the threshold vacuum and boost pressure being lower than the threshold pressure. In an alternate representation, during the first condition, canister load is higher and during the second condition, canister load is lower.

In this way, a ratiometric purge is used to improve the completion of canister purging. By providing purge flow as a fixed fraction of total engine fuel, instead of at a fixed purge flow rate or at a fixed proportion of intake airflow, limits imposed on the purging are reduced. In particular, the approach allows higher absolute amounts of canister fuel vapors to be slowly "sipped" into the engine when the canister is more loaded while allowing a remainder of canister fuel vapors to be "gulped" into the engine when the canister is less loaded. By increasing airflow through a canister at lower loads to maintain a constant fuel vapor fraction, canister heating and desorption is improved, increasing the efficiency of complete canister purging. By purging the fuel vapors to two different locations of the engine at mutually exclusive conditions, purge flow restrictions are reduced. Overall, canister performance and exhaust emissions are improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of canister purging comprising:
controlling an air flow rate into an engine to achieve an operator demand for power, the air flow rate provided from a compressor or from induction by the engine through a throttle; and
controlling flow of a purge mixture when a preselected fuel vapor fraction of total engine fuel is reached, where the controlling includes adjusting a fuel purge flow rate so that the preselected fuel vapor fraction of the total engine fuel is maintained as engine fueling changes with load, even if a higher purge flow rate than the adjusted fuel purge flow rate is possible.

2. The method of claim 1, further comprising purging a mixture of fuel vapors and ambient air from a fuel vapor storage canister, and dependent upon engine operating conditions, routing said purged mixture into a position upstream of said compressor.

3. The method of claim 1, further comprising purging a mixture of fuel vapors and ambient air from a fuel vapor storage canister, and dependent upon engine operating conditions, routing said purged mixture into a position downstream of said compressor.

4. The method of claim 1, further comprising determining fuel vapor flow rates downstream or upstream of said compressor from an indication of flow rate of said purge mixture and an indication of fuel vapor content of said purge mixture; and delivering the fuel to the engine at a rate to achieve a substantially stoichiometric air-fuel ratio of a total of said controlled air flow entering said engine and said ambient air in said purge mixture entering said engine to a total of said liquid fuel and said fuel vapor entering said engine.

5. The method of claim 4, wherein controlling the airflow rate comprises controlling a bypass around said compressor or controlling said throttle.

6. The method of claim 5, wherein a fuel vapor storage canister is coupled to a fuel tank and said purging commences under entry conditions based on engine coolant temperature.

7. The method of claim 6, wherein fuel injection includes direct fuel injection.

8. The method of claim 7, wherein engine operating conditions include one or more of pressure in a manifold coupled between said throttle and intake valves of said engine; ambient pressure; or boost pressure.

9. The method of claim 1, wherein the compressor is included in a turbocharger and is driven by a turbine coupled to an exhaust of the engine.

10. The method of claim 5, wherein the delivered fuel to achieve the stoichiometric air/fuel ratio is determined in part by feedback from at least one exhaust gas oxygen sensor coupled to an exhaust of said engine.

11. The method of claim 10, wherein the determined fuel vapor flow rate may be determined in part from the feedback.

12. The method of claim 11, wherein a first purge control valve is placed between a fuel vapor storage canister and a position upstream of said compressor.

13. The method of claim 12, wherein a second purge control valve is placed between the fuel vapor storage canister and a position downstream of the compressor.

14. The method of claim 13, wherein the purge mixture is routed to the position downstream of the compressor under high engine load conditions, and routed to the position upstream of the compressor under low engine load conditions, and routed to both of said positions concurrently when high rates of purge are desired.

15. The method of claim 1, wherein adjusting the fuel purge flow rate includes increasing the fuel purge flow rate as a load of a fuel vapor storage canister decreases.

16. The method of claim 1, wherein the preselected fuel vapor fraction is at least 20% of total engine airflow.

17. A method comprising:
during a first condition, when intake manifold vacuum is higher than a threshold vacuum, purging the canister to an engine intake, downstream of an intake throttle, using intake vacuum; and
during a second condition, when boost pressure is higher than a threshold pressure, purging a canister to the engine intake, upstream of a compressor, using vacuum generated at an aspirator coupled in a compressor bypass path, where an elector shut-off valve (ESOV) is electrically actuated to generate the vacuum at the aspirator, the ESOV coupled in a bypass conduit, and where the ESOV is separate from the compressor bypass valve.

18. The method of claim 17, wherein during the first condition, purge flow is received in the engine intake via a first conduit including a purge valve and not including the aspirator, while during the second condition, purge flow is received in the engine intake via a second conduit including the aspirator and not including the purge valve.

19. The method of claim 17, wherein during the first condition, manifold pressure is lower than barometric pressure, and during the second condition, manifold pressure is higher than barometric pressure.

20. The method of claim 19, wherein during each of the first and second conditions, purge flow is adjusted to be a preselected proportion of total engine fuel, the total engine fuel based on engine airflow.

* * * * *